United States Patent [19]
Krish, Jr.

[11] Patent Number: 6,058,875
[45] Date of Patent: May 9, 2000

[54] HINGED STAIRWAY SYSTEM FOR WATER VEHICLES

[76] Inventor: Ted Krish, Jr., 5204 Roman Dr., Louisville, Ky. 40291

[21] Appl. No.: 09/280,402

[22] Filed: Mar. 29, 1999

Related U.S. Application Data

[63] Continuation-in-part of application No. 08/993,366, Dec. 18, 1997, Pat. No. 5,887,540.

[51] Int. Cl.[7] ...................................................... B63B 17/00
[52] U.S. Cl. .............................................. 114/362; 182/97
[58] Field of Search ...................... 114/343, 362, 114/364; 182/82, 90–93, 97, 89, 127

[56] References Cited

U.S. PATENT DOCUMENTS

| | | | |
|---|---|---|---|
| 2,896,831 | 7/1959 | Ellingson | 114/362 |
| 2,971,601 | 2/1961 | Fortune | 114/362 |
| 4,541,507 | 9/1985 | Gibellato | 182/97 |
| 5,427,049 | 6/1995 | Mardikian | 114/362 |

*Primary Examiner*—Ed Swinehart
*Attorney, Agent, or Firm*—Scott R. Cox

[57] ABSTRACT

A hinged stairway system for water vehicles containing a stairway and ladder rung system for use in the water, a hinge system secured to the stairway system, a locking system securable to the hinge system, a tubular support bar secured to the locking system and a system for securing the stairway system to the transom of a water vehicle.

16 Claims, 6 Drawing Sheets

HINGED STAIRWAY SYSTEM FOR WATER VEHICLES

This application is a continuation-in-part of application Ser. No. 08/993,366, filed Dec. 18, 1997, now U.S. Pat. No. 5,887,540.

BACKGROUND OF INVENTION

1. Field of Invention

This invention relates to a stairway for attachment to water vehicles; more particularly it relates to a hinged, detachable stairway system for attachment to the transom, side, back, or bow of a water vehicle.

2. Description of Related Art

Many current boat ladders are difficult to use by individuals attempting to enter or leave the water. Sometimes this task is made even more difficult if the individual utilizing these ladders is an older individual or is carrying heavy, oversized equipment. For example, it is often difficult for individuals with diving equipment to climb over a boat's edge.

A variety of platform and ladder systems have been developed and marketed for attachment to the transoms of water vehicles, molded swim platforms or to the top or side edge of boats, such as pontoon boats, to assist in boarding or debarking from the water vehicle.

These boat ladder systems are generally divided into two categories: (1) those that are permanently attached to the side or transom of a water vehicle, or (2) those that are detachable from the side or transom of a water vehicle for storage and use. This invention is directed towards this second type of detachable boat ladder system.

A number of different types of boat ladders have been designed for attachment to the transom or rear of a water vehicle or for hooking over the edge of a boat or other type of water vehicle. For example, Des. Pat. No. 243,854 discloses boat steps which are attached to the transom of the boat apparently by the use of a pair of slot members which fit into a pair of sleeves secured to the transom of the boat. Another boat ladder, which utilizes a back plate (18) which fits within three brackets (16), which are themselves secured to the side or transom of a boat, is described in U.S. Pat. No. 3,794,140.

Conventionally, boat ladders attachable to the transom of a boat, utilize a bracket which is secured to the transom. The boat ladder is then attached to this bracket, for example, as shown in U.S. Pat. Nos. 4,462,485, 4,712,503, 3,794,140, 4,765,438 and 4,768,618.

Boat ladders which are secured or attached to a boat, are often rotated about a hinge for easy removal from the water when not in use. Such an arrangement is disclosed, for example, in U.S. Pat. Nos. 4,724,925, 4,501,507, 4,462,485, 5,537,949, and 4,765,438.

These boat ladder systems are designed generally for attachment to the transom of a wooden, metal, or fiberglass water vessel. Attachment of a boat ladder system creates special problems because of the construction of the watercraft. It is frequently difficult to secure conventional boat ladder systems to watercraft, especially systems designed to provide an angle of departure to ease access to the deck area.

In addition, current boat ladder systems for attachment to water vehicles are frequently difficult to attach to the sides of a water vehicle. When these boat ladder systems are being used, there is often a danger of pinching the hands of the individual who is using the boat ladder system.

Further, because water vehicles are constantly in motion in the water, it is important that these boat ladder systems be securely attached to the side or transom of the water vehicle while in a raised position or in use. It is also important that these boat ladder systems be easily removable for storage on the water vehicle.

Accordingly, it is an aspect of this invention to disclose a hinged stairway system for use with water vehicles.

It is a still further aspect of this invention to disclose a hinged stairway system specifically designed for use with a swim platform attached to a water vehicle, or any related marine use.

It is a still further aspect of the invention to disclose a hinged stairway system which eliminates any pinch point for an individual using the stairway system.

It is a still further aspect of the invention to disclose a locking system for securing the hinged stairway system in place while in use.

It is a still further aspect of the invention to disclose a system for attaching a hinged stairway system to a tubular support system, which is itself secured to the transom of a boat and supported by a swim platform.

It is a still further aspect of the invention to disclose a locking system for locking the hinged stairway system in the water.

These and other aspects of the invention can be obtained by the disclosed hinged stairway system for use with water vehicles.

SUMMARY OF INVENTION

The present invention is a hinged stairway system (10) for use with water vehicles which includes a stairway and ladder rung system (12) for use in the water, a hinge system (14) secured to the stairway and ladder rung system (12), a spring loaded locking system (16) rotatably securable to the hinge system (14), a pair of tubular support bars (18) secured to the locking system (16) and a transom plate with catch system (24) to which the tubular support bars (18) are attached. In a preferred embodiment, the hinged stairway system (10) further includes a hook bar (22) secured to one end of the tubular support bar (18) for attachment to the transom plate with catch system (24). The transom plate with catch system (24) is secured to the transom (26) of the water vehicle (20).

DETAILED DESCRIPTION OF THE PREFERRED EMBODIMENT

Figure 1:
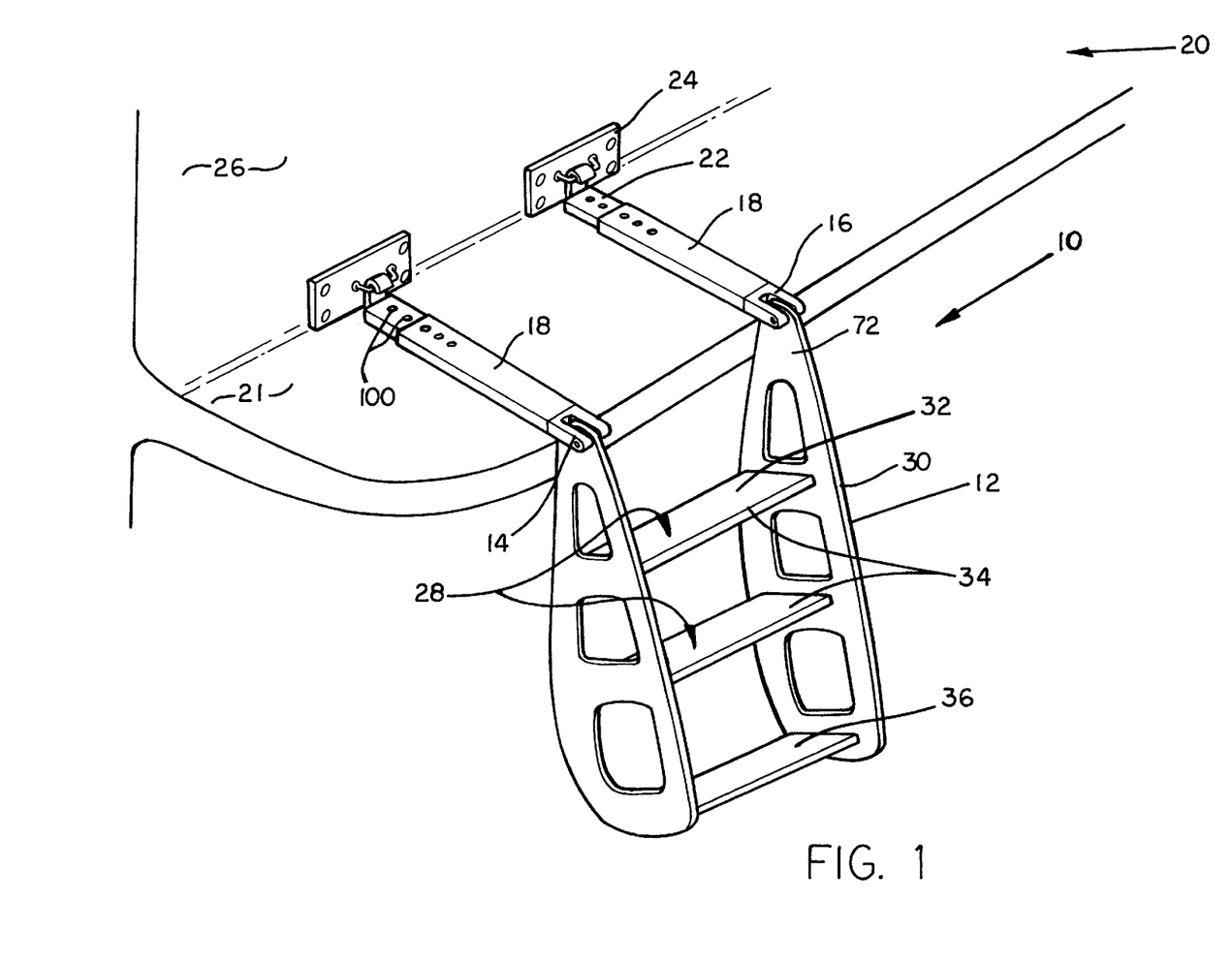
FIG. 1 is a perspective view of the stairway and ladder system installed against the transom of a boat.
Figure 2:
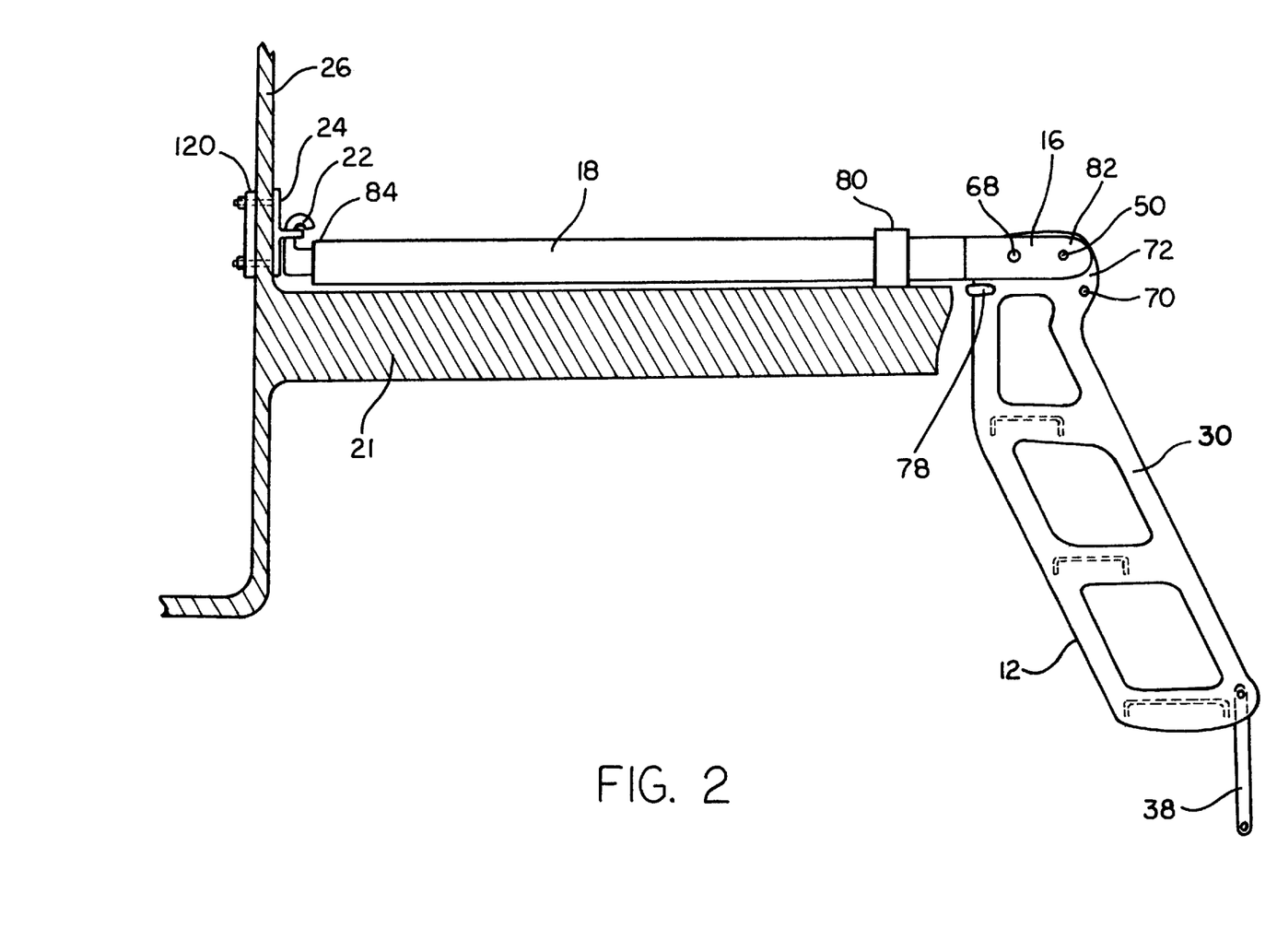
FIG. 2 is a side view of the stairway and ladder system installed against the transom of a boat with the stairway and ladder rung system in the water.
Figure 3:
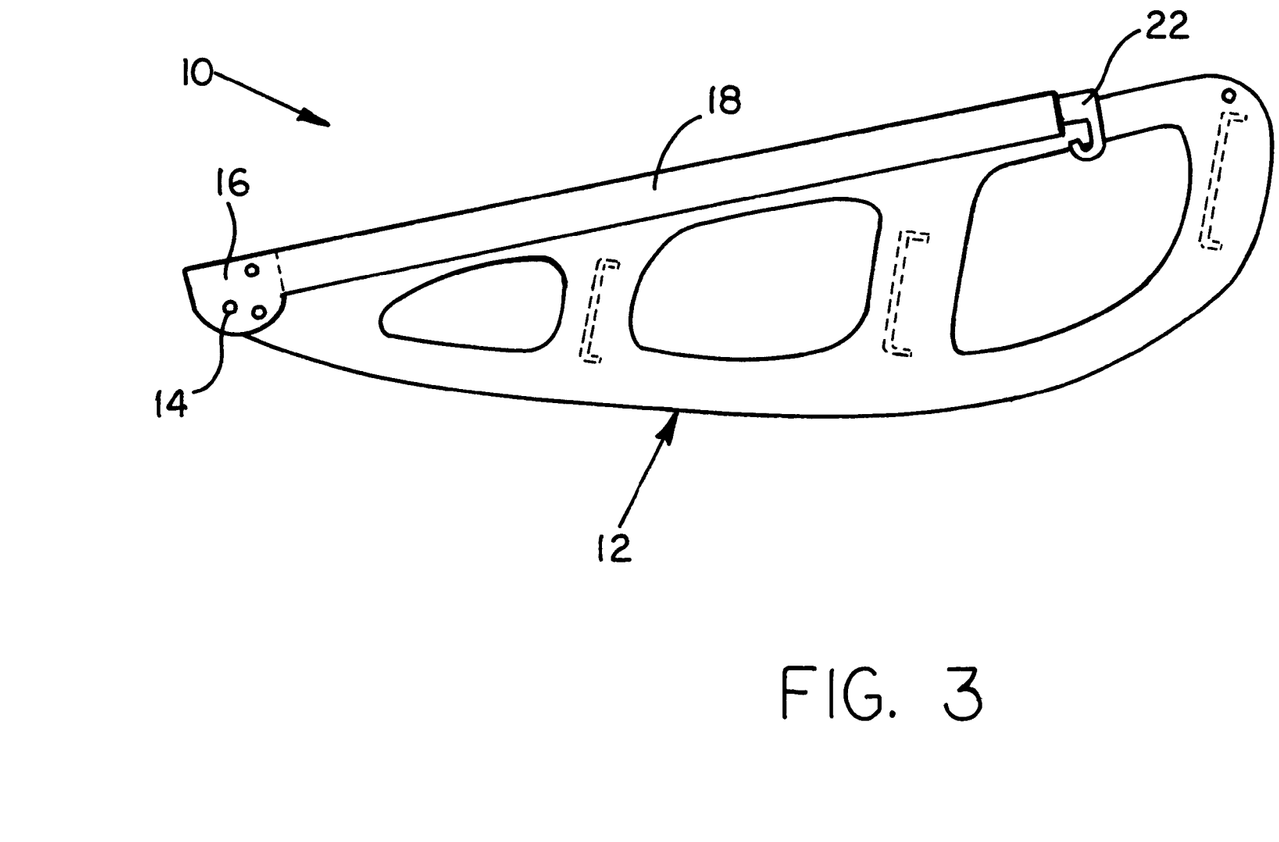
FIG. 3 is a side view of the stairway and ladder system raised and in a position for storing.

The present invention is a hinged stairway system (10) for water vehicles (20) and includes a stairway and ladder rung system (12), a hinge system (14), a spring loaded, locking system (16), and a pair of tubular support bar (18) which are preferably secured to the transom (26) of the water vehicle (20) as shown in FIGS. 1, 2 and 3. While one end (82) of each tubular support bar (18) is secured to the spring loaded, locking system (16), the opposite end (84) is preferably secured to a hook bar (22) as shown in FIG. 2. The hook bar (22) rotates the hinged stairway system (10) within a transom plate with catch system (24), which system is secured to the transom (26) of the water vehicle (20) as shown in FIGS. 1 and 2.

The hinged stairway system (10) may be attached to any type of water vehicle (20). However, in one preferred embodiment, it is specifically designed for securing to the deck or transom (26) of a water vehicle (20). As shown in FIGS. 1 and 2.

The stairway and ladder rung system (12) of the hinged stairway system (10) is designed to assist those attempting to enter the water from the water vehicle (20) or exit the water into the water vehicle (20). The stairway and ladder rung system (12) contains a frame (30) to which steps (32) are secured by conventional means. The stairway and ladder rung system (12) is constructed of conventional materials, such as aluminum or plastic. The stairway and ladder system (12) may have any number of individual steps (32), each with a step plank (28). In one preferred embodiment, two step planks (34) and a platform (36) are provided, as shown in FIG. 1. Preferably for ease of use, the bottom plank forms the platform (36) and is placed in the water at a location that it is below the surface of the water when the hinged stairway system (10) is in use. The width of the individual step planks (28) can vary, preferably from about 18 inches to about 3 feet in width, although other widths are within the scope of the present invention. In one preferred embodiment, there is attached to the bottom step plate or platform (36) of the stairway and ladder system (12) a swivel ladder (38). This swivel ladder (38) includes a bar with side supports extending downward from the stairway and ladder system (12) which swivels around its attachment mechanism to the stairway and ladder system (12). This swivel ladder (38) permits easier access to the stairway and ladder system (12) by a person coming out of the water as shown in FIGS. 1 and 2.

Attached to the top portion of the stairway and ladder rung system (12) are the remaining elements of the hinged stairway system (10) including the hinge system (14). The hinge system (14) can be any conventional hinge which is secured to the top end of the stairway and ladder rung system (12) by conventional securing means, such as pins, or other attachment systems. In a preferred embodiment as shown in FIGS. 1 and 2, the hinge system (14) is a hinge bar (50) which rotates within two openings in the sides of the spring loaded, locking system (16).

Figure 4:
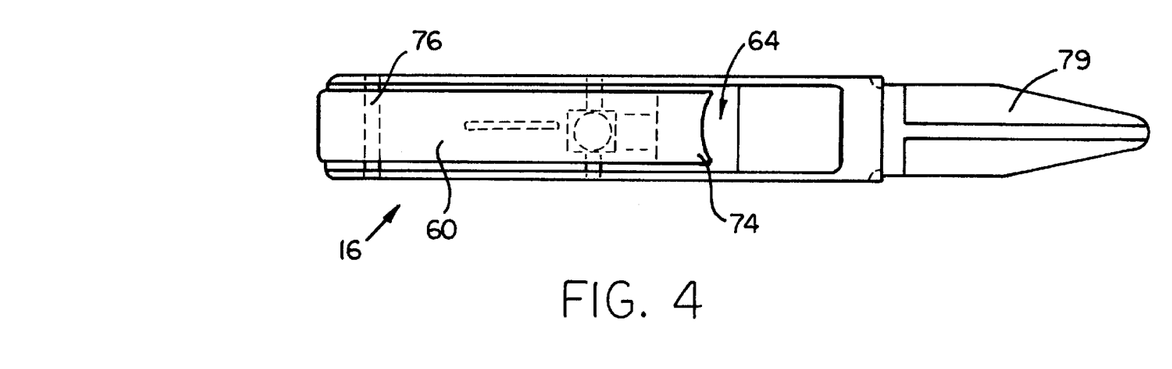
FIG. 4 is a side view of the spring loaded locking system.
Figure 5:
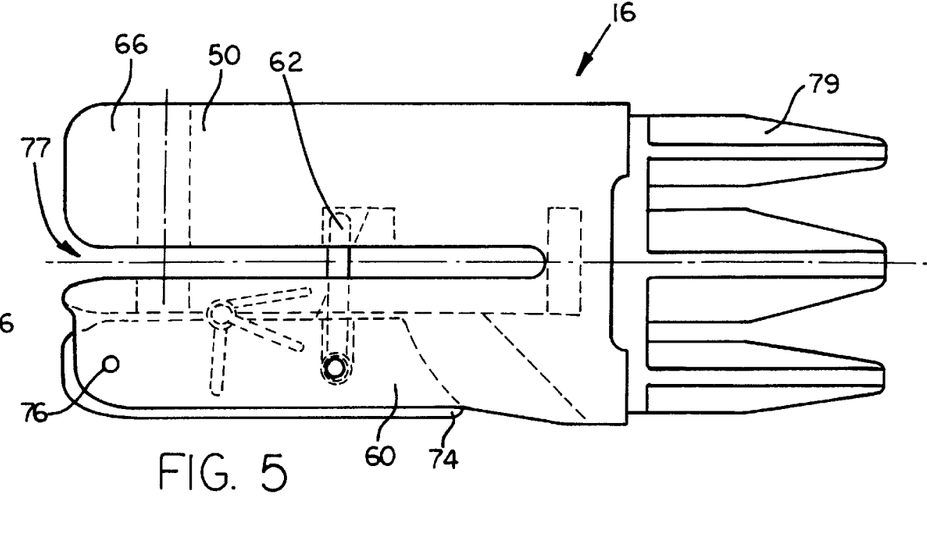
FIG. 5 is a top view of the spring loaded locking system.
Figure 6:
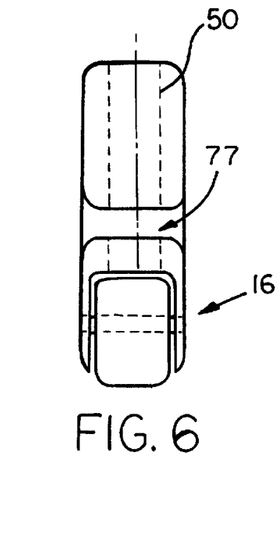
FIG. 6 is an end view of the spring loaded locking system.

The spring loaded, locking system (16) as shown in FIGS. 4, 5 and 6 includes a spring loaded lever bar (60) and a lever pin (62) contained within a slot (64) which is cut into the side of the body (66) of the spring loaded, locking system (16). See FIG. 5. The lever pin (62) interacts with two openings (68 and 70) in a side plate (72) which forms the top section of the stairway and ladder rung system (12) as shown in FIG. 2. The spring loaded lever bar (60) is a metal, rectangular-shaped bar with a lip (74). The slot (64) is cut such that there provides easy access to the lip (74). Upon pulling on the lip (74), the spring loaded lever bar (60) rotates about a vertical pin (76) secured in the body (66) near the end of the spring loaded, locking system. A slit (77) is cut in the body (66) of the spring loaded, locking system (16). The side plate (72) of the stairway and ladder rung system (12) rotates within this slit (77) of the spring loaded, locking system (16) as it moves from being placed in the water to its stored position. In the position shown in FIGS. 1 and 2, the lever pin (62) has penetrated one of the opening (68) in the side plate (72) of the stairway and ladder rung system to lock the system (16) in its down position. When the lip (74) of the spring loaded lever bar (60) is pulled out from the slot (64) in the side of the spring loaded locking system, the lever pin (62) is retracted through the opening (68) in the side plate (72) of the stairway and ladder rung system (12). This permits the ladder and rung system (12) to rotate about the hinge bar (50) over the top of the tubular support bars (18) until the second opening (70) in the side plate (72) of the stairway and ladder rung system (12) lines up with the lever pin (62). Release of the spring loaded lever bar (70) allows the lever pin (62) to pass through this second opening (70) in the side plate (72) to secure the stairway and ladder rung system (12) in its stored position as shown in FIG. 3.

The spring loaded lever bar (60) is encouraged to remain within the slot (64) by a conventional spring system (not shown) secured to and around the vertical pin (76) or by any other conventional closing system that encourages the spring loaded lever bar (60) to remain within the slot (64). When the stairway and ladder rung system (12) is rotated to its down position in the water, it is locked in place by the locking pin (62) passing through the opening (68) in the side plate (72). Attached on the upper edge of the side plate (72) is a support bar (78) as shown in FIG. 2, which preferably is a horizontal bar of sufficient structure to support the weight of the ladder and rung system (12). When the ladder and rung system (12) is in its down position, it will rest against the bottom surface of the spring loaded, locking system (16) and the top of the deck or swim platform (21). This support bar (78) provides further support for the stairway and ladder rung system (12) and prevents it from rotating any further, which could possibly result in injury to the individual installing the ladder system (10).

The spring loaded, locking system (16) is secured to the tubular support bar (18). Preferably a pair of spring loaded. locking systems (16) are secured to a pair of tubular support bars (18) as shown in FIG. 1. Into one end (80) of each tubular support bar (18) is inserted one end (79) of the spring loaded, locking system (16). This end (79) is secured within that end (80) of the tubular support bars (18) conventionally, such as by welding, pinning or bolting, to secure the tubular support bar (18) to the spring loaded, locking system (16).

The tubular support bars (18) can be produced from any structure which provides sufficient support for the remaining elements of the stairway and ladder rung system (12) and yet be securable to both the swim platform (21) and the transom (26) of the water vehicle (20). It also provides access from the bow of a beached water vehicle. In a preferred embodiment, these tubular support bars (18) are extended rectangular or oval bars, produced from hollow aluminum bars whose length and width are determined by the size of the swim platform (21) of the water vehicle (20). For example, in one preferred embodiment, the tubular support bars (18) are from about twelve (12) to about seventy-two (72) inches in length, from about two (2) to about four (4) inches in width and from about one-fourth (¼) inch to about two (2) inches in height.

The tubular support bars (18) rest against the top surface of the swim platform (21) as shown in FIG. 2. In order to help hold the tubular support bars (18) in place against the swim platform (21), preferably an attachment system is used to hold the tubular support bars (18) in place. In one preferred embodiment, a hook and loop fastener system (80) is secured both to the swim platform (21) and across the top of the tubular support bar (18) as shown, for example, in FIG. 2.

Figure 7:
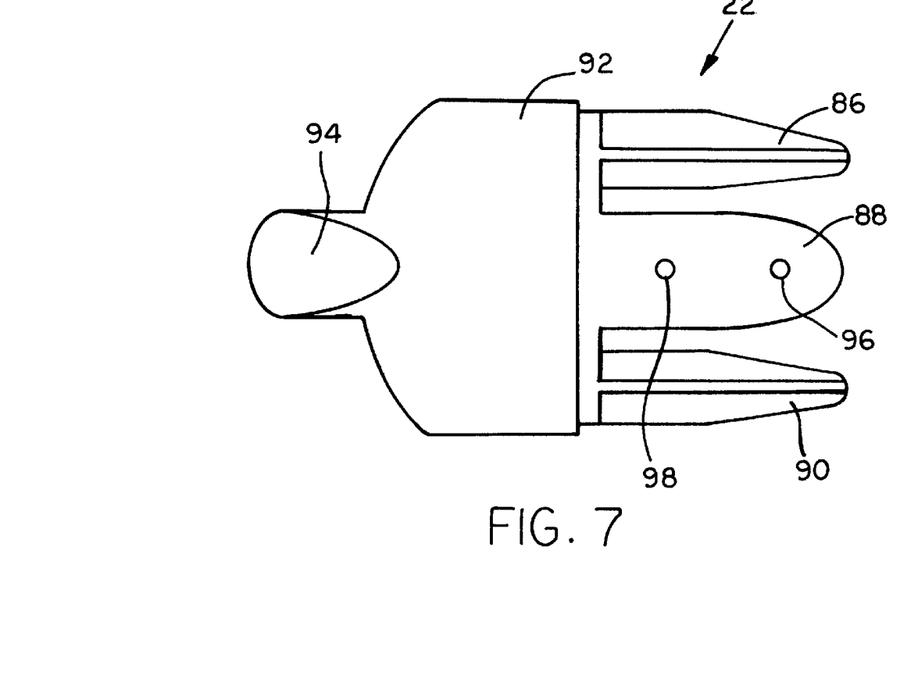
FIG. 7 is a top view of the hook bar.
Figure 8:
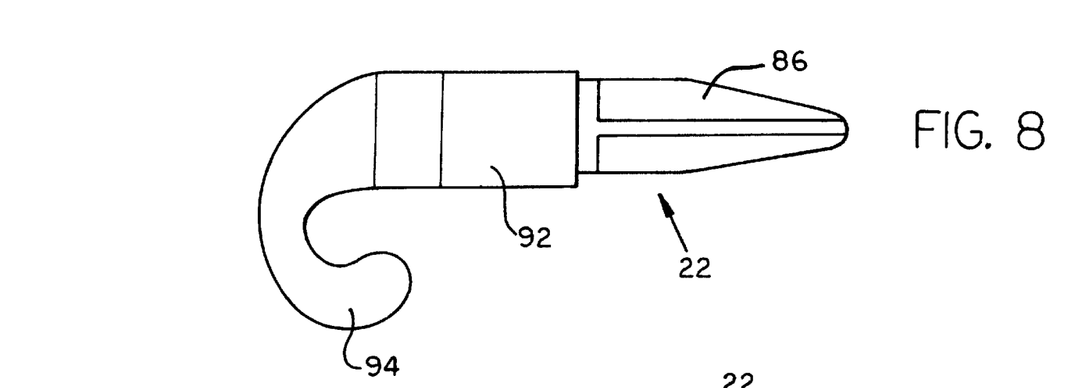
FIG. 8 is a side view of the hook bar.
Figure 9:
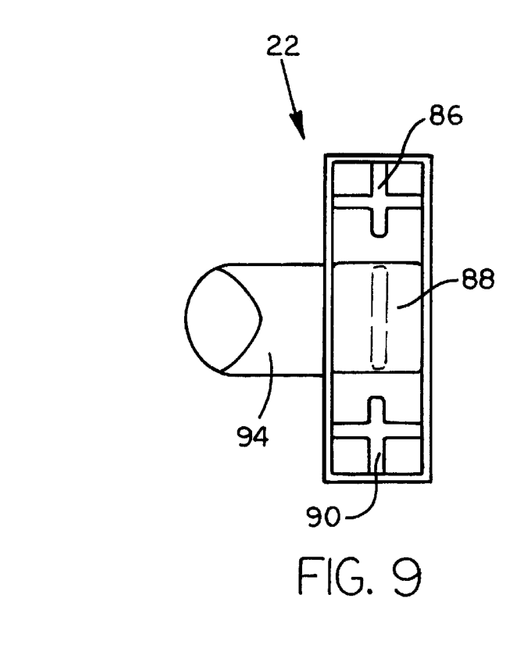
FIG. 9 is an end view of the hook bar.

Secured to the opposite end (84) of the tubular support bar (18) is the hook bar (22). The hook bar (22) as shown on FIGS. 7, 8 and 9 is secured within an opening in that end (84) of the tubular support bar (18) by any conventional means, such as welding, pinning or bolting. In a preferred embodiment a set of pins is placed in openings in both the hook bar (22) and the tubular support bar (18) after the hook bar (22) has been inserted in the end (84) of the tubular support bar (18).

In one preferred embodiment, as shown in FIGS. 7, 8 and 9, the hook bar (22) consists of three prongs (86, 88, 90), a main body portion (92) and a hook portion (94). The middle prong (86) contains the pair of openings (96, 98) which line up with openings (100) in the end (84) of the tubular support bar (18). Pins (not shown) are inserted in these openings (100) in the top of the tubular support bar (18) which then pass into the openings (96, 98) in the middle prong (88) of the hook bar (22) to hold the hook bar (22) securely in place within that end (84) of the tubular support bar (18).

The three prongs (86, 88, 90) extend from one end of the main body portion (92) and the hook portion (94) extends from the opposite end of the main body portion (92) of the hook bar (22) as shown in FIG. 7. The hook portion (94) of the hook bar (22) is preferably C-shaped, such that it will fit within an opening (112) in a catch opening element (116) in the transom plate with catch system (24). The hook bar (22) can be produced from the same components as the remaining elements of the hinged stairway system (10).

Figure 10:
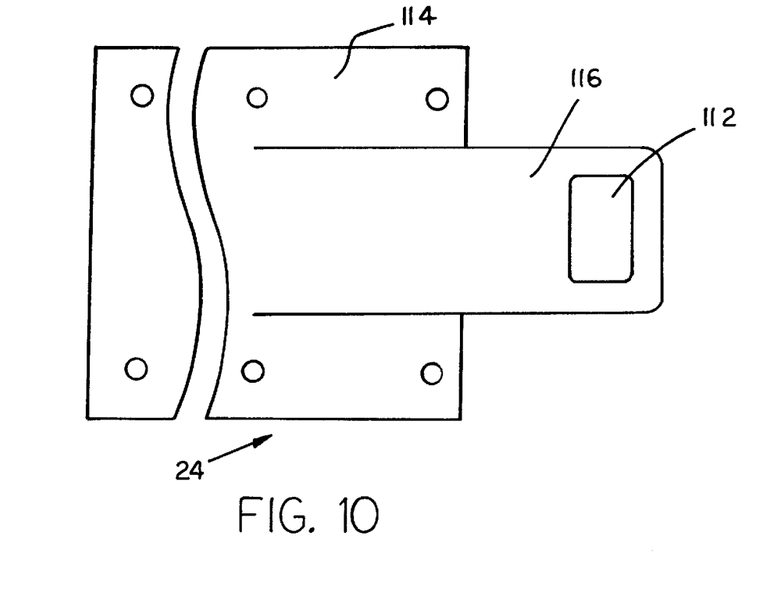
FIG. 10 is a top view of the transom plate with catch system.
Figure 11:
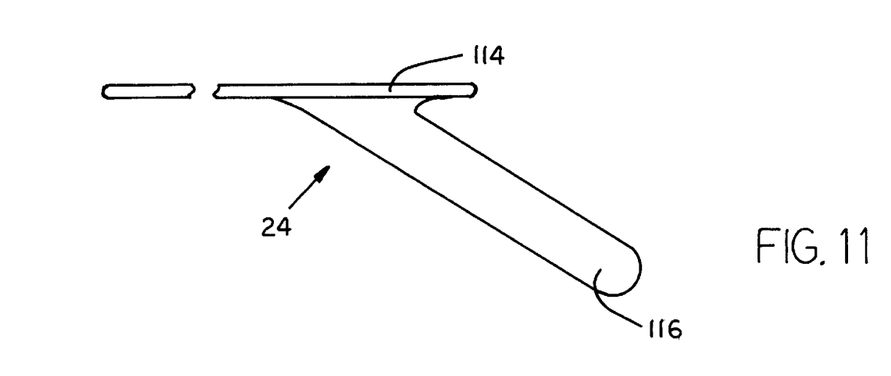
FIG. 11 is a side view of the transom plate with catch system.
Figure 12:
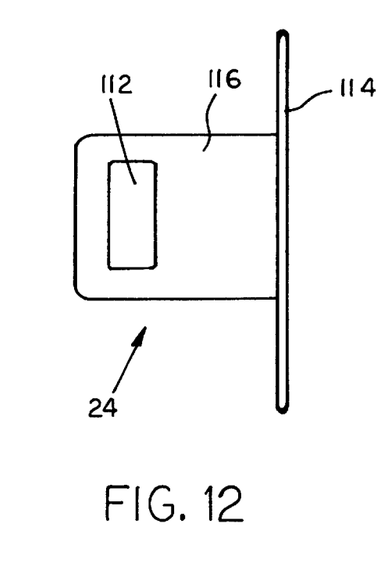
FIG. 12 is an end view of the transom plate with catch system.

The transom plate with catch system (24) as shown in FIGS. 10, 11 and 12 consists of a plate (114), preferably a sturdy metal plate to be secured against the transom (26) of the water vehicle (20), and the catch opening element (116) with catch opening (12) through which the C-shaped hook portion (94) of the hook bar (22) passes. In a preferred embodiment, a backup plate (120) is secured on the opposite side of the transom (26) as shown in FIG. 2. The transom plate with catch system (24) is secured to the transom (21) of the boat by a conventional securing system. For example, bolts pass through the transom (26) for securing both the transom plate (118) of the transom plate with catch system (24) and the backup plate (120) in place against the transom (26) of the water vehicle (20).

The catch opening element (116) extends away from the transom plate (114) at any angle appropriate for utilization, depending on the angle of the swim platform (21) which extends from the transom (26) of the water vehicle (20). For example, as shown in FIG. 11, the catch opening element (116) extends at an angle that is approximately 60 degrees upward from perpendicular.

In operation, the transom plate with catch system (24) is first secured to the transom (26) of the water vehicle (20). It is preferably secured by passing bolts or screws through the transom plate (114), the transom (26) and the backup plate (120). The placement of the transom plate with catch system (24) should be such that the hook portion (94) of the hook bar (22) passes through the catch opening (112) of the catch opening element (116) in the transom plate (114) with catch system (24) and still allow the tubular support bars (18) to rest against the top surface of the swim platform (21). Because one end of the hook bar (22) is secured within one end of the tubular support bar (18), once the hook bar (22) is secured in the catch opening (112) in the transom plate with catch system (24), the tubular support bars (18) rest against the swim platform (21). To hold these tubular support bars (18) in place against the surface of the swim platform (21), preferably a hook and loop fastener system (80) is secured to the top surface of the swim platform (21) and across the top of the tubular support bars (18).

The spring loaded, locking system is secured within the opposite end (82) of the tubular support bars (18) from the hook bar (22). The stairway and ladder rung system (12) is stored against the top of the tubular support bar (18) as shown in FIG. 3. Thus, to use this system the stairway and ladder rung system (12) is rotated about the hinged bar (50) until it locks in place in a position approximately perpendicular and downward from the tubular support bar (18). In order to store the hinged stairway system (10) or to remove the stairway and ladder rung system (12) with attached tubular support bar (18) from the transom plate with catch system (24), the spring loaded lever bar (60) of the spring loaded, snag-free locking system (16) is rotated away from the side of the locking system (16). The stairway and ladder rung system (12) is then rotated about the hinge bar (50) until the lever pin (62) of the locking system (16) lines up and is captured by the opening (70) in the side plate (72) of the stairway and ladder rung system (12). This locks the stairway and ladder rung system (12) against the tubular support bars (18). The system (10) can then be rotated around the transom plate with catch system (24) for removal and storage.

It will be apparent from the foregoing that while particular forms of the invention have been illustrated and described, various modifications can be made without departing from the spirit and scope of the invention. Accordingly, it is not intended that the invention be limited.

I claim:

1. A hinged stairway system for water vehicles comprising
   a ladder rung system,
   a hinge system rotatable secured to the ladder rung system,
   a locking system rotatable secured to the hinge system,
   a tubular support bar secured to the locking system, and
   a hook system secured to the tubular support bar for attachment to the water vehicle.

2. The hinged stairway system of claim 1 further comprising a swivel ladder secured to the ladder rung system.

3. The hinged stairway system of claim 1 further comprising a submerged platform secured to the ladder rung system.

4. The hinged stairway system of claim 1 further comprising a transom plate with catch system for attachment to the tubular support bar.

5. The hinged stairway system of claim 1 wherein the hook system comprises a hook portion, a main body portion and a plurality of prongs wherein the hook portion interacts with a transom plate with catch system for attachment to the water vehicle.

6. The hinged stairway system of claim 1 further comprising a system for securing the tubular support bar to a surface of the water vehicle wherein said securing system comprises a hook and loop fastener.

7. A hinged stairway system for water vehicles comprising a ladder rung system, a hinge system rotatably secured to the ladder rung system, a locking system rotatably secured to the hinge system, a tubular support bar secured to the locking system, and wherein the locking system comprises a body element, a lever bar rotatably secured to the body element and a lever pin secured to the lever bar.

8. The hinged stairway system of claim 7 wherein the locking system interacts with a side plate of the ladder rung system to allow the ladder rung system to lock in position.

9. The hinged stairway system of claim 7 further comprising a swivel ladder secured to the ladder rung system.

10. The hinged stairway system of claim 7 further comprising a submerged platform secured to the ladder rung system.

11. The hinged stairway system of claim 7 wherein the locking system interacts with a side plate of the ladder rung system to allow the ladder rung system to lock in position.

12. The hinged stairway system of claim 7 further comprising a transom plate with catch system for attachment to the tubular support bar.

13. The hinged stairway system of claim 7 wherein the hook system comprises a hook portion, a main body portion and a plurality of prongs wherein the hook portion interacts with a transom plate with catch system for attachment to the water vehicle.

14. The hinged stairway system of claim 7 further comprising a system for securing the tubular support bar to a surface of the water vehicle wherein said securing system comprises a hook and loop fastener.

15. A hinged stairway system for water vehicles comprising a ladder rung system, a hinge system rotatably secured to the ladder rung system, a locking system rotatably secured to the hinge system, wherein the locking system comprises a body element, a spring loaded lever bar and a lever pin, wherein said lever pin interacts with openings in the ladder rung system, and a tubular bar secured to the locking system.

16. The hinged stairway system of claim 15 further comprising a hook system secured to the tubular bar.

* * * * *